(12) United States Patent
Lannert et al.

(10) Patent No.: US 6,289,572 B1
(45) Date of Patent: *Sep. 18, 2001

(54) SEALING ARRANGEMENT

(75) Inventors: Berthold Lannert, Fürth; Hans-Gerd Eckel, Laudenbach; Horst Kober; Stefan Burger, both of Weinheim, all of (DE)

(73) Assignee: Firma Carl Freudenberg, Weinheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/072,237

(22) Filed: May 4, 1998

Related U.S. Application Data

(60) Continuation of application No. 08/699,371, filed on Aug. 19, 1996, now Pat. No. 5,788,904, which is a division of application No. 08/590,992, filed on Jan. 24, 1996, now Pat. No. 5,713,577.

(30) Foreign Application Priority Data

Feb. 3, 1995 (DE) .............................. 195 03 469

(51) Int. Cl.$^7$ ....................................... B21B 1/46
(52) U.S. Cl. ................. 29/527.2; 425/47; 29/898.11
(58) Field of Search ............... 29/277, 264, 888.3, 29/527.1, 527.4, 527.2, 898.11, 607; 425/DIG. 47; 427/128; 277/2, 80, 37, 152; 384/448, 484, 485, 480

(56) References Cited

U.S. PATENT DOCUMENTS

| | | |
|---|---|---|
| 3,767,739 * | 10/1973 | Smith . |
| 3,875,654 * | 4/1975 | Ushijima . |
| 4,159,298 * | 6/1979 | Bainard . |
| 4,161,120 | 7/1979 | Cloarec . |
| 4,505,484 | 3/1985 | Ohkuma et al. . |
| 4,825,824 * | 5/1989 | Deuring et al. . |
| 4,830,518 | 5/1989 | Shirantani et al. . |
| 4,850,722 | 7/1989 | Bayer . |
| 4,948,277 | 8/1990 | Alff . |
| 5,017,868 | 5/1991 | Hajzler . |
| 5,026,178 | 6/1991 | Ballhaus . |
| 5,131,763 | 7/1992 | Caron . |
| 5,261,753 | 11/1993 | Endoh et al. . |
| 5,348,314 * | 9/1994 | Antonini . |
| 5,407,213 | 4/1995 | Ouchi et al. . |
| 5,431,513 | 7/1995 | Hajzler . |
| 5,713,577 * | 2/1998 | Lannert et al. . |
| 5,788,904 * | 8/1998 | Lannert et al. . |

FOREIGN PATENT DOCUMENTS

| | | |
|---|---|---|
| 29 17 232 | 11/1979 | (DE) . |
| 0 375 019 | 6/1990 | (EP) . |
| 0 378 939 | 7/1990 | (EP) . |
| 2 574 501 | 6/1986 | (FR) . |
| 1181045 | 2/1970 | (GB) . |
| 2 110 773 | 6/1983 | (GB) . |
| WO 94/02953 | 2/1994 | (WO) . |

* cited by examiner

*Primary Examiner*—P. W. Echols
*Assistant Examiner*—Steven Blount
(74) *Attorney, Agent, or Firm*—Kenyon & Kenyon

(57) ABSTRACT

A sealing arrangement including a sealing ring with a support ring extending substantially in a radial direction. The support ring is joined in the radial direction to a first sealing element that lies in contact with and is nonrotatable with respect to a first machine element to form a static seal. The support ring is also joined in the radial direction to a second sealing element that is placed against a second machine element rotatably with respect to the second machine element to create a dynamic seal. The first and second sealing elements are each made of an elastomeric material, and the sealing ring has, in order to sense rotational movements of the first machine element about its axis, at least one auxiliary device that can move past a rotational speed sensor. The auxiliary device can be a multipole ring made of a pasty, hardenable, and magnetizable material that is arranged as a intermediate layer of film-like thinness on the side of the support ring facing the rotational speed sensor. The multipole ring has north and south poles alternating in the circumferential direction and extending in the radial direction, and the multipole ring is completely covered by the elastomeric material of the first and/or second sealing elements.

6 Claims, 1 Drawing Sheet

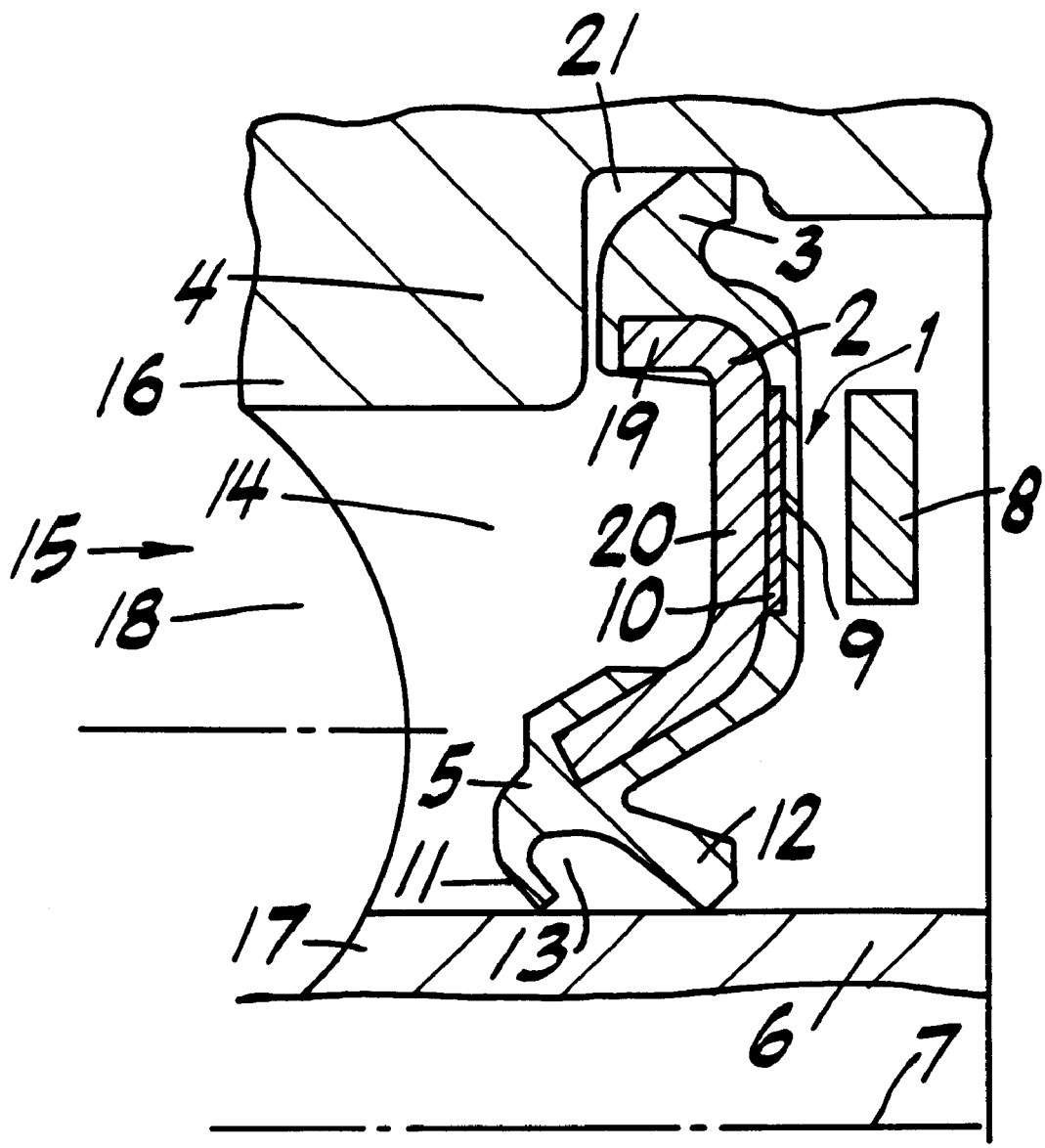

SEALING ARRANGEMENT

RELATED APPLICATIONS

This application is a continuation of prior application No. 08/699,371, filed Aug. 19, 1996, now U.S. Pat. No. 5,788,904 which is a division of Ser. No. 08/590,992 filed Jan. 24, 1996, now U.S. Pat. No. 5,713,577.

BACKGROUND OF THE INVENTION

1. Field of the Invention

The present invention concerns a sealing arrangement, including a sealing ring with a support ring extending substantially in the radial direction. The support ring is joined in the radial direction to a first sealing element that lies in contact with and is nonrotatable with respect to a first machine element in a statically sealing manner. The support ring is joined in the radial direction to a second sealing element that can be placed against a second machine element rotatably with respect thereto and in a dynamically sealing manner. The first and second sealing elements are each made of an elastomeric material, and the sealing ring has, in order to sense rotational movements of the first machine element about its axis, at least one auxiliary device that can move past a rotational speed sensor.

2. Description of the Prior Art

Sealing arrangements are generally known and are used, for example, to seal wheel bearings in motor vehicles. If the motor vehicle is equipped with an ABS antilock braking system, the sealing arrangement can include an inductive transducer to sense the rotational speed of the vehicle wheel. The transducer, which rotates along with the vehicle wheel and usually is a disk made of metallic material with surface discontinuities regularly distributed in the circumferential direction, is movable past the rotational speed sensor. The surface discontinuities can be, for example, recesses or impressions distributed in the circumferential direction. The manufacture of such sealing arrangements is complex and unsatisfactory from an economic standpoint. In addition, a sealing ring equipped with a metal sensor ring has a comparatively large mass. When the surface discontinuities are acted upon by contaminants, for example splashed water, dust, and/or mud, errors in transmission to the rotational speed sensor can occur, thus impairing reliable determination of rotational speed.

SUMMARY OF THE INVENTION

It is an object of the present invention to eliminate the above-mentioned disadvantages and provide a sealing arrangement that can be manufactured easily and cost-effectively, which has outstanding service characteristics in terms of sealing and rotational speed sensing over a long service lifetime, and is of comparatively light weight.

To achieve the objects of the invention, provision is made for the auxiliary device to be a multipole ring made of a pasty, hardenable, and magnetizable material that is arranged as a intermediate layer of film-like thinness on the side of the support ring facing the rotational speed sensor. The multipole ring may have north and south poles alternating in the circumferential direction and extending in the radial direction. The multipole ring may be completely covered by the elastomeric material of the first and/or second sealing elements.

The multipole ring has an extraordinarily low mass, and is protected in outstanding fashion from external influences by being completely covered by the first and/or second sealing elements. Preferably the multipole ring is covered at least by the first Sealing element. The sealing arrangement can be used, for example, to seal wheel bearings that are installed in construction vehicles. Moisture, dust, or mud cannot disadvantageously influence sensing of the rotational speed of the first machine element. Because the multipole ring is of film-like thinness and therefore has very little weight, the entire sealing ring has a comparatively low inertial mass, as a result of which the mechanical stress on the sealing ring occasioned by changes in the rotational speed of the first machine element is very low.

According to an advantageous embodiment, it is possible for the multipole ring to be made of at least two magnetic materials differing from one another. The advantage of such an arrangement is that the use of mixed pastes made of different magnetic materials makes it possible to achieve broad-band temperature/signal characteristics. A consistently good signal is thus received by the rotational speed sensor regardless of the temperatures that occur.

The magnetic materials can have a substantially homogeneous distribution within the multipole ring. The advantage is that because only one paste is applied, the multipole ring is simple and economical to manufacture.

According to another embodiment, the magnetic materials can be joined to one another in layered fashion in the direction of the rotational speed sensor. The different magnetic pastes are applied to the support ring by a pressure or metering method; each of the layers should first be hardened before the next layer is applied. A layered configuration of this kind makes it easy to adapt the materials of the multipole ring to a wide variety of use conditions.

The multipole ring and the support ring are adhesively joined and can form a preassembled unit. Subsequent to application of the multipole ring to the support ring and hardening thereof, the two sealing elements are added to the unit.

The present invention also concerns a method for manufacturing a sealing ring as described above. At least one pasty, magnetizable material is applied, in a first process step, onto the side of the support ring facing the rotational speed sensor to produce the multipole ring, which material is then hardened. The hardened multipole ring is magnetized in a second process step. In a third process step, vulcanization of the first and second selling elements causes the multipole ring to be covered by at least the elastomeric material of the first sealing element. This method makes it easy to manufacture the multipole ring, which is adapted in terms of its temperature/signal behavior to the particular use conditions. Because the multipole ring is, with a method of this kind, already magnetized in the second process step (after it has hardened, and before vulcanization of the first and second elements), the magnetic properties of the multipole ring can be checked even before the two sealing elements are shaped onto the support ring. If the magnetic properties should not meet the particular requirements when tested, this can be determined before the sealing elements are vulcanized on.

According to another method, in a first step at least one pasty magnetizable material can be applied, to produce the multipole ring, to the side of the support ring facing the rotational speed senior, which material is then hardened. The hardened multipole ring is covered, in a second process step, by at least the elastomeric material of the first sealing element by vulcanization of the first and second sealing elements. The multipole ring is magnetized in a third process step.

The magnetizable material of the multipole ring can be at least two homogeneously distributed magnetic materials that are applied, by pressure or a metering process, to the end surface of the support ring facing the rotational speed sensor.

According to another method it is possible, in order to produce the multipole ring, for at least two magnetic materials to be applied in succession onto the support ring, and for the second magnetic material not to be applied until after hardening of the first magnetic material. With a method of this kind, multipole rings can be adapted to the particular use conditions by a suitable combination of magnetic materials.

Both when a paste of at least two homogeneously distributed magnetic materials are used, and when different magnetic materials are applied in successive steps, combinations of magnetic materials are selected which achieve the broadest possible band of temperature/signal characteristics, and thus allow proper transmission of signals to the rotational speed sensor regardless of the temperatures at which the sealing ring is used.

The pasty material for producing the multipole ring can be applied onto the material of the support ring, and the resulting preassembled unit can, following hardening of the pasty material of the multipole ring, be deformed into the shape of the support ring and then punched out. Manufacture of the sealing ring is simplified by the fact that the metal sheet later processed into the support ring is already, as a coil, coated on one side with magnetic paste. This is advantageous in terms of simple and cost-effective large-scale manufacture.

A further simplification in the manufacture of the sealing ring can be achieved when the first and second sealing elements are produced by vulcanization of only one elastomeric material. The sealing ring is configured as a single-material sealing ring, the material used being one that has both good characteristics in terms of static sealing of the first sealing element and low abrasive wear on the dynamically loaded second sealing element, thus ensuring good service characteristics over a long service lifetime.

BRIEF DESCRIPTION OF THE DRAWINGS

Sealing arrangement according to the present invention is explained in more detail below with reference to the drawing figure, which shows a cross-sectional view of an exemplary embodiment of the invention.

DETAILED DESCRIPTION OF THE INVENTION

The drawing figure shows a sealing arrangement that includes a sealing ring 1 that is arranged in the radial direction between first and a second machine elements 4, 6. In this exemplary embodiment the sealing arrangement is a component of a wheel suspension of a motor vehicle, the first and second machine elements 4, 6 being components of a wheel bearing that is configured as a rolling bearing 15. Rolling bearing 15 includes an outer ring 16 and an inner ring 17, which are braced rotatably relative to one another by rolling elements 18 distributed in the circumferential direction. Sealing ring 1, which is joined nonrotatably relative to outer ring 16 of rolling bearing 15, includes a first sealing element 3 for static sealing with respect to outer ring 16, and a second sealing element 5 for dynamic sealing with respect to the inner ring. Second sealing element 5 is braced on inner ring 17 with two sealing lips 11, 12 axially adjacent one another.

A multipole ring 9 that is arranged on the side of support ring 2 of sealing ring 1 facing rotational speed sensor 8 is provided in order to sense the rotational movement of outer ring 16, which is joined nonrotatably to the vehicle wheel (not depicted here). Multipole ring 9 is made of a magnetized elastomeric material and has north and south pole alternating in the circumferential direction and extending in the radial direction which, as the vehicle wheel rotates, move alternately past rotational speed sensor 8.

In the exemplary embodiment, first sealing element 3 and second sealing element 5 are configured integrally and continuously with one another of a uniform material, and cover multipole ring 9 which is configured as an intermediate layer 10. In the exemplary embodiment, outer ring 16 is equipped with a groove 21 which extends around the inner circumference and is open toward inner ring 17, and whose length in the axial direction corresponds substantially to the dimensions of first sealing element 3 in the same direction. First and second sealing elements 3, 5 completely surround support ring 2, together with intermediate layer 10, on the side opposite space 14 that is to be sealed off. Intermediate layer 10, of which multipole ring 9 is made, is of film-like thinness, and is completely surrounded by the elastomeric material of first and second sealing elements 3, 5. Multipole ring 9 is thus well protected from external influences that might reduce its service lifetime.

In manufacturing the present invention, at least one pasty, magnetizable material is applied, in a first process step, onto the side of the support ring 2 facing the rotational speed sensor 8 to produce the multipole ring 9. The magnetizable material is then hardened. The hardened multipole ring 9 is magnetized in a second process step. In a third process step, vulcanization of the first and second sealing elements 3, 5 causes the multipole ring 9 to be covered by at least the elastomeric material of the first sealing element 3. The magnetic properties of the multipole ring 9 can be checked even before the two sealing elements 3, 5 are shaped onto the support ring 2. If the magnetic properties should not meet the particular requirements when tested, this can be determined before the sealing elements 3, 5 are vulcanized on.

According to another method, in a first step at least one pasty magnetizable material can be applied, to produce the multipole ring 9, to the side of the support ring 2 facing the rotational speed sensor 8, which material is then hardened. The hardened multipole ring 9 is covered, in a second process step, by at least the elastomeric material of the first sealing element 3 by vulcanization of the first and second sealing elements 3, 5. The multipole ring 9 is magnetized in a third process step.

The step of applying a magnetizable material can include applying at least two homogeneously distributed magnetic materials that are applied, by pressure or a metering process, to the end surface of the support ring 2 facing the rotational speed sensor 8.

According to another method it is possible, in order to produce the multipole ring 9, for at least two magnetic materials to be applied in succession onto the support ring 2, and for the second magnetic material not to be applied until after hardening of the first magnetic material. With a method of this kind, multipole rings can be adapted to the particular use conditions by a suitable combination of magnetic materials.

The pasty material for producing the multipole ring 9 can be applied onto the material of the support ring 2, and the resulting preassembled unit can, following hardening of the pasty material of the multipole ring 9, be deformed into the shape of the support ring 2 and then punched out. Manufacture of the sealing ring 1 is simplified by the fact that the metal sheet later processed into the support ring 2 is already, as a coil, coated on one side with magnetic paste. This is advantageous in terms of simple and cost-effective large-scale manufacture.

A further simplification in the manufacture of the sealing ring can be achieved when the first and second sealing elements 3, 5 are produced by vulcanization of only one elastomeric material. The sealing ring is configured as a single-material sealing ring, the material used being one that has both good characteristics in terms of static sealing of the first sealing element and low abrasive wear on the dynamically loaded second sealing element, thus ensuring good service characteristics over a long service lifetime.

While the invention has been described in the specification and illustrated in the drawings with reference to preferred embodiments, it will be understood by those skilled in the art that various changes may be made and equivalents may be substituted for elements of the invention without departing from the scope of the claims.

What is claimed is:

1. A method for manufacturing a sealing ring comprising the steps of:

providing a support ring having a circumference and a circumferential direction extending around the circumference;

applying at least one pasty, magnetizable material onto a side of said support ring to produce a multipole ring with north and south poles alternating in the circumferential direction;

hardening said multipole ring;

magnetizing said multipole ring; and vulcanizing first and second sealing elements, each made of an elastomeric material, to said support ring, such that said multipole ring is covered by at least said elastomeric material of said first sealing element, said step of vulcanizing being accomplished after said step of magnetizing.

2. A method for manufacturing a sealing ring comprising the steps of:

providing a support ring with a circumference and a circumferential direction extending around the circumference;

applying at least one pasty, magnetizable material onto a side of said support ring to produce a multipole ring with north and south poles alternating in the circumferential direction;

hardening said multipole ring;

vulcanizing first and second sealing elements, each made of an elastomeric material, to said support ring, such that said multipole ring is covered by at least said elastomeric material of said first sealing element; and magnetizing said multipole ring, said step of magnetizing being accomplished after said step of vulcanizing.

3. The method of claim 1, wherein:

said step of vulcanization comprises producing said first and second sealing elements simultaneously by vulcanization of only one elastomeric material.

4. The method of claim 2, wherein:

said step of vulcanization comprises producing said first and second sealing elements simultaneously by vulcanization of only one elastomeric material.

5. A method for manufacturing a sealing ring comprising the steps of:

providing a support ring with a circumference and a circumferential direction extending around the circumference;

applying at least one pasty, magnetizable material onto a side of said support ring to produce a multipole ring with north and south poles alternating in the circumferential direction;

hardening said multipole ring, wherein after said step of hardening, said support ring is deformed and punched out;

magnetizing said multipole ring; and vulcanizing first and second sealing elements, each made of an elastomeric material, to said support ring, such that said multipole ring is covered by at least said elastomeric material of said first sealing element, said step of vulcanizing being accomplished after said step of magnetizing.

6. A method for manufacturing a sealing ring comprising the steps of:

providing a support ring with a circumference and a circumferential direction extending around the circumference;

applying at least one pasty, magnetizable material onto a side of said support ring to produce a multipole ring with north and south poles alternating in the circumferential direction;

hardening said multipole ring, wherein after said step of hardening, said support ring is deformed and punched out;

vulcanizing first and second sealing elements, each made of an elastomeric material, to said support ring, such that said multipole ring is covered by at least said elastomeric material of said first sealing element; and magnetizing said multipole ring, said step of magnetizing being accomplished after said step of vulcanizing.

* * * * *